United States Patent [19]

Bose et al.

[11] Patent Number: 4,712,603
[45] Date of Patent: Dec. 15, 1987

[54] METHOD OF MAKING A NICKLE HIGH-CHROMIUM BASE BRAZING FILLER METAL

[75] Inventors: Debasis Bose, Randolph; Alfred Freilich, Livingston, both of N.J.

[73] Assignee: Allied Corporation, Morris Township, Morris County, N.J.

[21] Appl. No.: 931,320

[22] Filed: Nov. 17, 1986

Related U.S. Application Data

[62] Division of Ser. No. 710,343, Mar. 11, 1985, Pat. No. 4,658,531, which is a division of Ser. No. 441,465, Nov. 15, 1982.

[51] Int. Cl.$^4$ .............................................. B22D 11/06
[52] U.S. Cl. ................................................... 164/463
[58] Field of Search ........................................ 164/463

[56] References Cited

U.S. PATENT DOCUMENTS

| | | | |
|---|---|---|---|
| 4,190,095 | 2/1980 | Bedell | 164/463 |
| 4,588,015 | 5/1986 | Liebermann | 164/463 |
| 4,607,683 | 8/1986 | Hamashima et al. | 164/463 |

*Primary Examiner*—M. Jordan
*Attorney, Agent, or Firm*—Gerhard H. Fuchs; Ernest D. Buff; Gus T. Hampilos

[57] ABSTRACT

A nickel based high melting point, homogeneous, ductile brazing foil composition consists essentially of about 17 to 20 atom percent chromium, about 4 to 10 atom percent boron, about 10 to 16 atom percent silicon, the balance being nickel and incidental impurities. The composition is such that the total of nickel and chromium ranges from about 74 to 84 atom percent.

3 Claims, 2 Drawing Figures

METHOD OF MAKING A NICKLE HIGH-CHROMIUM BASE BRAZING FILLER METAL

This application is a division of application Ser. No. 710,343, filed Mar. 11, 1985, now U.S. Pat. No. 4,658,531, issued Apr. 21, 1987, which, in turn, is a divisional of Ser. No. 441,465, filed Nov. 15, 1982.

BACKGROUND OF THE INVENTION

1. Field of the Invention

This invention relates to brazing of metal parts and, in particular, to a homogeneous, ductile nickel-based brazing material useful in brazing stainless steels and high nickel alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

The selection of a particular brazing filler metal for a specific application depends basically on its solidus and liquidus temperatures. The term "solidus" refers to the highest temperature at which a metal or alloy is completely solid, and the term "liquidus" refers to the lowest temperature at which the metal or alloy is completely liquid. In any brazing process, the brazing filler metal must possess a solidus temperature that is high enough to provide it with adequate strength to meet the service requirements of the metal parts brazed together. Certain critical parts of aircraft engines, such as honeycomb air seals, are in service at high temperatures. Therefore, the filler metals used for brazing these parts have high solidus temperatures. A filler metal designated as AWS-BNi-5 is commonly used in such applications because it possesses the highest solidus temperature in the entire BNi family of alloys. This filler metal also provides adequate strength and corrosion resistance due to its high chromium content (about 19 wt. percent).

A major drawback of the AWS BNi-5 composition is the difficulty of producing it in ductile foil form. The AWS BNi-5 composition contains a substantial amount (about 10 wt. percent) of the metalloid element silicon and has heretofore been available only in the form of a powder, powder-binder paste or powder-binder tape. Powders are generally unsuitable for many brazing operations such as brazing parts of complex shapes. The organic binder present in powder-binder paste and powder-binder tapes bakes off during brazing, leaving objectionable voids and residues which are detrimental to the joints. A 100% dense, flexible brazing filler metal foil having characteristics similar to BNi-5 would, therefore, be highly desirable for many brazing applications.

Some brazing alloys are available in foil form. Such materials are (1) fabricated through a costly sequence of rolling and careful heat-treating steps, or (2) fabricated by quenching a melt of the alloy on a rotating quench wheel at a rate of at least about $10^5$ °C./sec. Rolled foil is not sufficiently ductile to permit stamping of complex shapes therefrom. Quenched foil, disclosed by U.S. Pat. No. 4,148,973, represents a substantial improvement over rolled foils, but has heretofore evidenced melting, oxidation and corrosion characteristics not especially suited for effecting high temperature brazements, such as honeycomb air seals in aircraft turbine engines.

Ductile glassy metal alloys have been disclosed in U.S. Pat. No. 3,856,513, issued Dec. 24, 1974 to H. S. Chen et al. These alloys include compositions having the formula $M_a Y_b Z_c$, where M is a metal selected from the group consisting of iron, nickel, cobalt, vanadium and chromium; Y is an element selected from the group consisting of phosphorus, boron and carbon; and Z is an element selected from the group consisting of aluminum, silicon, tin, germanium, indium, antimony and beryllium; "a" ranges from about 60 to 90 atom percent; "b" ranges from about 10 to 30 atom percent. Also disclosed are glassy wires having the formula $T_i X_j$, where T is at least one transition metal and X is an element selected from the group consisting of phosphorus, boron, carbon, aluminum, silicon, tin, germanium, indium, beryllium and antimony; "i" ranges from about 70 to 87 atom percent and "j" ranges from about 13 to 30 atom percent. Such materials are conveniently prepared by rapid quenching from the melt using processing techniques that are now well-known in the art. No brazing compositions are disclosed therein, however.

There remains a need in the art for a brazing alloy that has characteristics (i.e., high solidus temperature and superior resistance against corrosion and oxidation) similar to BNi-5, but is readily manufactured in the form of a thin, homogeneous, ductile foil.

SUMMARY OF THE INVENTION

In accordance with the invention, there is provided a homogeneous, ductile brazing foil useful as a filler metal for a brazed metal article. Generally stated, the foil has a composition consisting essentially of about 17 to 20 atom percent chromium, about 10 to 16 atom percent silicon, about 4 to 10 atom percent boron, balance being essentially nickel and incidental impurities, the composition being such that the total of nickel and chromium ranges from about 74 to 84 atom percent and total of boron and silicon ranges from about 16 to 26 atom percent. The brazing foil is composed of metastable material having at least 50 percent glassy structure, and has a thickness less than about 76.2 μm (0.003 inch). It has been found that use of a brazing foil that is flexible, thin and homogeneous, and which has a composition as described above, improves braze joint strength, enhances joining precision and reduces process time.

More specifically the brazing foil has a thickness of about 25.4 μm (0.001 inch) to 63.5 μm (0.0025 inch). Preferably, the brazing foil of this invention is at least partially glassy and consists essentially of about 17.5 to 18.5 atom percent chromium, about 12.5 to 13.5 atom percent silicon, about 5 to 6 atom percent boron, balance being nickel and incidental impurities.

Further, there is provided in accordance with the invention, an improved process for joining two or more metal parts by brazing. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly.

The improvement comprises employing, as the filler metal, a homogeneous, nickel based foil that has the composition given above.

The element chromium provides the alloy with improved corrosion and oxidation resistance, while the presence of boron and silicon depress the alloy's melting point.

The alloys of the present invention contain substantial amounts of boron (about 4 to 10 atom percent) and silicon (about 10 to 16 atom percent), which are present in the solid state as hard and brittle borides and silicides. Accordingly, the alloys of the invention are especially suited for fabrication into flexible thin foil by rapid solidification techniques. Foil produced in this manner is composed of a metastable material having at least 50% glassy structure and a thickness of less than 76 μm (0.003 inch). Other methods, such as (1) rolling, (2) casting or (3) powder metallurgical techniques can, of course, be applied to fabricate these alloys to a foil form. However, use of a thin flexible and homogeneous foil, is especially beneficial for brazements wherein the mating surfaces have wide areas with narrow clearances and for brazing joints having complex shapes. The alloys of the invention can also be produced in powder form by gas or water atomization of the alloy or by mechanical comminution of a foil composed thereof.

BRIEF DESCRIPTION OF THE DRAWINGS

The invention will be more fully understood and further advantages will become apparent when reference is made to the following detailed description of the preferred embodiment of the invention and the accompanying drawings, each of which is a combined plan and elevation of a machined tensile test specimen brazed with the alloys of the present invention.

DETAILED DESCRIPTION OF THE INVENTION

Figure 1:
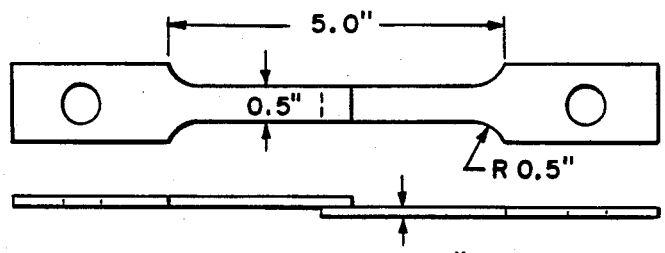

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous ductile brazing material in foil form is provided. The brazing foil is less than 76 μm (0.003") thick, preferably about 38 μm (0.0015") thick to 63.5 μm (0.0025") thick and most preferably about 12.7 μm (0.0005") to 38 μm (0.0015") thick. Generally stated, the brazing foil has a composition consisting essentially of about 17 to 20 atom percent chromium, about 10 to 16 atom percent silicon, about 4 to 10 atom percent boron, the balance being essentially nickel and incidental impurities. The composition is such that the total of nickel and chromium ranges from about 74 to 84 atom percent and the total of boron and silicon ranges from about 16 to 26 atom percent. These compositions are compatible with all stainless steels, as well as nickel and cobalt base alloys.

By homogeneous is meant that the foil, as produced, is of substantially uniform composition in all dimensions. By ductile is meant that the foil can be bent to a round radius as small as ten times the foil thickness without fracture.

Examples of brazing alloy compositions within the scope of the invention are set forth in Table I below:

TABLE I

| Sample No. | Ni | Cr | Si | B |
|---|---|---|---|---|
| 1 at % | 62 | 18 | 10 | 10 |
| wt % | 73.31 | 18.85 | 5.66 | 2.18 |
| 2 at % | 61 | 19 | 10 | 10 |
| wt % | 72.23 | 19.93 | 5.66 | 2.18 |
| 3 at % | 61 | 19 | 12 | 8 |
| wt % | 71.73 | 19.79 | 6.75 | 1.73 |
| 4 at % | 61 | 19 | 14 | 6 |
| wt % | 71.24 | 19.66 | 7.82 | 1.29 |
| 5 at % | 61 | 19 | 11 | 9 |
| wt % | 71.98 | 19.86 | 6.21 | 1.96 |
| 6 at % | 63.56 | 17.81 | 13.22 | 5.41 |
| wt % | 73.35 | 18.20 | 7.30 | 1.15 |
| 7 at % | 61 | 19 | 14 | 6 |
| wt % | 71.24 | 19.65 | 7.82 | 1.29 |
| 8 at % | 61 | 19 | 15 | 5 |
| wt % | 70.99 | 19.58 | 8.35 | 1.07 |
| 9 at % | 61 | 19 | 16 | 4 |
| wt % | 70.75 | 19.52 | 8.88 | 0.85 |
| 10 at % | 60 | 20 | 13 | 7 |
| wt % | 70.41 | 20.78 | 7.30 | 1.51 |
| 11 at % | 63 | 17 | 16 | 4 |
| wt % | 72.88 | 17.42 | 8.85 | 0.85 |
| 12 at % | 61 | 19 | 13 | 7 |
| wt % | 71.48 | 19.72 | 7.29 | 1.51 |

The brazing foils of the invention are prepared by cooling a melt of the desired composition at a rate of at least about $10^5$ °C./sec, employing metal alloy quenching techniques well-known to the glassy metal alloy art; see, e.g., U.S. Pat. Nos. 3,856,513 and 4,148,973, discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are above 13 μm (0.0005) to 76 μm (0.003) inch thick, which is also the desired spacing between bodies being brazed. Foil thickness, and hence spacing of about 13 μm (0.0005) to 36 μm (0.0014) inch maximizes the strength of the braze joint. Thinner foils stacked to form a thickness of greater than 0.0025 inch may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

EXAMPLE 1

Ribbons of about 2.54 to 25.4 mm (about 0.10 to 1.00 inch) wide and about 13 to 76 μm (about 0.0005 to 0.003 inch) thick were formed by squirting a melt of the particular composition by overpressure of argon onto a rapidly rotating copper chill wheel (surface speed about 3000 to 6000 ft/min.). Metastable homogeneous ribbons of substantially glassy alloys having the compositions set forth in Table I were produced.

EXAMPLE 2

The liquidus and solidus temperatures of the selected ribbons mentioned in Table I were determined by Differential Thermal Analysis (DTA) Technique. The individual samples were heated side by side with an inert reference material at a uniform rate and the temperature difference between them was measured as a function of temperature. The resulting curve, known as a thermogram, was a plot of heat-energy change vs. temperature, from which the beginning of melting and end of melting, known respectively as solidus and liquidus temperatures, was determined. Values thus determined are set forth in Table II below.

For comparison, the solidus and liquidus temperatures of the AWS BNi-5 alloy (Nicrobraz ®-30 powder, manufactured by Wall Colmonoy Corporation, Detroit, Mich.) was determined by the DTA technique as described above. These values, along with the nominal chemical composition of BNi-5 alloy, are set forth in Table III.

TABLE II

| Alloy | Composition (at %) | Liquidus °C. (F) | Solidus °C. (F) |
| --- | --- | --- | --- |
| Sample 3 | $Ni_{61}Cr_{19}Si_{12}B_8$ | 1087 | 960 |
| Sample 6 | $Ni_{63.6}Cr_{17.8}Si_{13.2}B_{5.4}$ | 1150 | 1065 |
| Sample 7 | $Ni_{61}Cr_{19}Si_{14}B_6$ | 1065 | 938 |
| Sample 8 | $Ni_{61}Cr_{19}Si_{15}B_5$ | 1108 | 920 |

TABLE III

| Alloy | Nominal Composition | Liquidus °C. (F) | Solidus °C. (F) |
| --- | --- | --- | --- |
| BNi—5 at % wt % | $Ni_{62.6}Cr_{18.9}Si_{18.4}$ $Ni_{71}Cr_{19}Si_{10}$ | 1150 | 1067 |

EXAMPLE 3

Tensile test specimens of dimensions 2.54 cm×12.7 cm×0.3175 cm (1"×5"×0.125") were cut from AISI type 316 stainless steel. A brazing alloy of the present invention, a glassy, ductile ribbon of nominal composition of the Sample No. 6 as provided in Table I, and having dimensions of about 0.0381 mm (0.0015") thick by 6.35 mm (0.25") wide was used to braze some of the test specimens. Brazed joints were of the lap type with overlaps of 2t, 3t and 4t, where t is the thickness of the test blank, 3.175 mm (0.125") in this case. Brazing specimens were degreased in acetone and rinsed with alcohol. Lap joints containing the selected brazing ribbon of the present invention were assembled by laying ribbons side by side to cover the entire length of the lap joint. The selected brazing ribbon of the present invention acted as the joint spacer. Specimens were then tack welded by gas tungsten arc welding to hold the assembly together.

For comparative purposes, samples were made in an identical manner to that described above using Nicrobraz ®-30 (AWS BNi-5) brazing paste (available commercially from Wall Colmonoy Corporation, Detroit, Mich.). In this case 0.0381 mm (0.0015") thick stainless steel spacers were placed at the two ends of the mating surfaces to provide joint clearance. The spacers were later removed during machining. The Nicrobraz ®-30 paste was applied only to one edge of the mating surfaces (perpendicular to the length of the test specimens). The assembly was then tack welded by gas tungsten arc welding.

All the samples were brazed in a vacuum furnace at a vacuum of $13.4 \times 10^{-3}$ Pa ($10^{-4}$ torr) at 1190° C. (2175° F.) for 5 minutes. Brazed samples were then machined to the dimensions as illustrated in FIG. 1 and tensile tested. Values thereby obtained are set forth in Table IV below.

TABLE IV

| Alloy | Overlap (t = 3.175 mm) | Shear Strength mpa (psi) | Tensile Strength mpa (psi) | Area of Failure |
| --- | --- | --- | --- | --- |
| Sample No. 6 | 2t | 238 (34,560) | 477 (69,120) | Joint |
| Nicrobraz ®-30 | 2t | 82 (11,840) | 163 (23,680) | Joint |
| Sample No. 6 | 3t | 105 (15,200) | 314 (45,600) | Joint |
| Nicrobraz ®-30 | 3t | 65 (9,470) | 204 (29,600) | Joint |
| Sample No. 6 | 4t | 134 (19,400) | 535 (77,600) | Base Metal |
| Nicrobraz ®-30 | 4t | 100 (14,520) | 400 (58,080) | Joint |

At overlaps of 2t and 3t (t=3.175 mm), all the brazements failed in the joint. Comparison of the strength values indicated that the joints made with Sample No. 6 alloy of the present invention were much stronger than those made with Nicrobraz ®-30 (AWS BNi-5) alloy.

When the area of overlap was increased to 4t (t=3.175 mm), all the brazed samples prepared with Sample No. 6 alloy of the present invention failed in the base metal, showing that the strength of the brazed joint was greater than that of the base metal. By way of contrast, each of the Nicrobraz ®-30 (AWS BNi-5)

brazements failed in the joint. This data indicates that joints constructed with an overlap of 4t (t=3.175 mm) and then brazed with Sample No. 6 alloy of the present invention were stronger than joints having the aforesaid construction that were brazed with Nicrobraz ®-30 (AWS BNi-5) alloy.

EXAMPLE 4

In order to demonstrate the elevated temperature performance of the alloys of the present invention, the following tests were carried out. Tensile test specimens of dimensions 2.54 cm×12.7 cm×0.159 cm (1"×5"×0.0625") were cut from AISI type 410 stainless steel. A brazing alloy of the present invention, a glassy, ductile ribbon of nominal composition of Sample No. 6 as provided in Table I and having dimensions of about 0.0381 mm (0.0015") thick by 6.35 mm (0.25") wide was used to braze some of the test specimens. Brazed joints were of the lap type with the lap dimension carefully controlled to 4t (t=0.3175 cm or 0.125"). Brazing specimens were degreased in acetone and rinsed with alcohol. Lap joints containing the selected brazing ribbons of the present invention were assembled by laying ribbons side by side to cover the entire length of the lap joint. The selected brazing ribbon of the present invention acted as the joints spacer. Specimens were then tack welded by gas tungsten arc welding to hold the assembly together.

For comparative purposes, samples were made in an identical manner to that described above using Nicrobraz ®-30 (AWS BNi-5) brazing paste (available commercially from Wall Colmonoy Corporation, Detroit, Mich.). In this case 0.0381 mm (0.0015") thick stainless steel spacers were placed at the two ends of the mating surfaces to provide joint clearance. The spacers were later removed during machining. The Nicrobraz ®-30 paste was applied only to one edge of the mating surfaces (perpendicular to the length of the test specimens). The assembly was then tack welded by gas tungsten arc welding.

Figure 2:
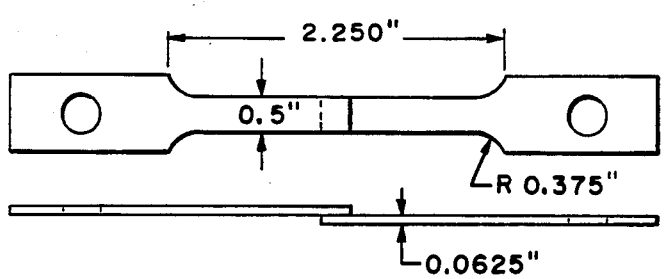

All the samples were brazed in a vacuum furnace at a vacuum of $13.4 \times 10^{-3}$ Pa ($10^{-4}$ torr) at 1190° C. (2175° F.) for 5 minutes. Brazed samples were then machined to the dimensions as illustrated in FIG. 2. Samples were then heat treated by austenitizing in vacuum at 982° C. (1800° F.), quenching in nitrogen and tempering at 565° C. (1050° F.) to achieve a base metal hardness of Rc (Rockwell 'C') 30–33. Heat treated samples were then tensile tested at 538° C. (1000° F.), the results are set forth in Table V.

TABLE V

| Alloy | Overlap (t = 3.175 mm) | Shear Strength mpa (psi) | Tensile Strength mpa (psi) | Area of Failure |
| --- | --- | --- | --- | --- |
| Sample No. 6 | 4t | (19,200) | (76,800) | Base Metal |
| Nicrobraz ®-30 | 4t | (15,866) | (63,466) | Joint |

All the brazed samples prepared with Sample No. 6 alloy of the present invention failed in the base metal, indicating that the strength of the brazed joint was greater than that of the base metal. By way of contrast, each of the Nicrobraz ®-30 (AWS BNi-5) brazements failed in the brazed joint. This data indicates that joints constructed with an overlap of 4t (t=0.3175 cm or 0.125") and then brazed with Sample No. 6 alloy of the present invention were stronger than joints having the aforesaid construction that were brazed with Nicrobraz ®-30 (AWS BNi-5) alloy.

We claim:

1. A process for fabricating homogeneous ductile foil having a composition consisting essentially of 17 to 20 atom percent chromium, 4 to 10 atom percent boron and 10 to 16 atom percent silicon, the balance being nickel and incidental impurities and the total of nickel and chromium ranging from about 74 to 84 atom percent, which process comprises forming a melt of the compositon and quenching the melt on a moving chill surface at a rate of at least about $10^5$ °C./sec.

2. The process of claim 1 in which the foil has a composition consisting essentially of 17.5 to 18.5 atom percent chromium, 12.5 to 13.5 atom percent silicon and 5 to 6 atom percent boron, the balance being nickel and incidental impurities.

3. The process of claim 1 in which said foil has a thickness ranging from 0.0010 to 0.0025 inch.

* * * * *